United States Patent [19]
Komatsu et al.

[11] Patent Number: 5,155,625
[45] Date of Patent: Oct. 13, 1992

[54] WATER-DROP-REPELLENT MIRROR INCLUDING A VIBRATION PLATE AND HEATING MEANS

[75] Inventors: Toru Komatsu, Shimada; Yasutoshi Itoh, Shizuoka; Naoto Iwanabe, Fujieda; Hidenori Sato, Shimizu, all of Japan

[73] Assignee: Murakami Kaimeido Co., Ltd., Shizuoka, Japan

[21] Appl. No.: 497,401

[22] Filed: Mar. 22, 1990

[30] Foreign Application Priority Data

| Mar. 24, 1989 | [JP] | Japan | 1-32665[U] |
| Mar. 27, 1989 | [JP] | Japan | 1-033163[U] |
| Mar. 27, 1989 | [JP] | Japan | 1-033164[U] |
| Jul. 7, 1989 | [JP] | Japan | 1-79588[U] |

[51] Int. Cl.$^5$ ............... B60R 1/06; G02B 7/182; H05B 3/84
[52] U.S. Cl. ................... 359/512; 359/507; 219/219
[58] Field of Search ......... 350/582, 588; 219/219; 15/250 B, 250 R; 310/321-321; 359/507, 512

[56] References Cited
U.S. PATENT DOCUMENTS

| 2,722,160 | 11/1955 | Prutzman | 350/588 |
| 3,686,473 | 8/1972 | Shirn et al. | 350/588 |
| 4,715,698 | 12/1987 | Haba | 350/588 |
| 4,833,373 | 5/1989 | Doi et al. | 350/582 |
| 4,929,072 | 5/1980 | Fujie et al. | 350/582 |

FOREIGN PATENT DOCUMENTS

| 2710588 | 9/1978 | Fed. Rep. of Germany | 350/588 |
| 70745 | 5/1982 | Japan | 350/582 |
| 57-70754 | 5/1982 | Japan | 15/250 R |
| 59-8548 | 1/1984 | Japan | 350/582 |
| 1178317 | 1/1970 | United Kingdom | 219/219 |

*Primary Examiner*—Jon W. Henry
*Attorney, Agent, or Firm*—Michael J. Striker

[57] ABSTRACT

A waterdrop repellent mirror provide a vibration plate which piezoelectric oscillator is affixed on the back side of the mirror, and a heater is placed therein to heat up the mirror surface. The piezoelectric oscillator on the rear surface of the mirror give ultra sonic wave vibration to the mirror through the vibration plate. When mirror surface resonate by inputting the vibration of the oscillator to the mirror, any waterdrop sticked on the mirror surface are dispersed. Re-sticked fine mist of waterdrop or frozen frost on the mirror surface can be removed by heated up the mirror, thereby clear mirror surface can be secured.

21 Claims, 6 Drawing Sheets

WATER-DROP-REPELLENT MIRROR INCLUDING A VIBRATION PLATE AND HEATING MEANS

BACKGROUND OF THE INVENTION

The present invention relates to an outer mirror to be used on the exterior of vehicles. More particularly, it relates to an outer mirror for vehicles which prevents sticking of water drops to the mirror surface by using a piezoelectric oscillator and a heater on the rear surface of the mirror.

DESCRIPTION OF THE PRIOR ART

Outer mirrors used on the exterior of vehicles often does not provide a clear view due to sticking of water drops of rain and mist during driving on rainy and humid days, and also the range of view of the mirror is impaired by clouding of its surface with frost or fog. This is dangerous for safe driving of vehicles.

One of well known conventional improvements involves the use of a wiper equipment on the outer surface of the mirror for mechanically wiping of its surface. In accordance with another improvement, a heated mirror is provided with a heater layer including an electrically conductive carbon on the rear surface of the mirror, so that the cloud on the surface of the mirror is removed by passing electricity through it. This is disclosed in Japanese Laid Open Utility Models numbers 51-68140 and 51-80842. In the former case, the range of view of mirror is screened by the wiper arm moving across the surface, and such swinging movements are troublesome for a driver. In the latter case, in order to remove the water drops the temperature of the mirror surface should be kept at about 50°-60° C., and therefore comparatively longer times are needed to reach certain temperature and additional time is needed for evaporation of water drops.

In order to improve such inconvenience, a vibration mirror is proposed in which a piezoelectric oscillator is provided on the rear surface of a conventional mirror, water drops on the mirror surface are dispersed and removed by vibration. This is disclosed in Japanese Laid Open Utility Model No. 62-82850. Generally, such a vibration mirror is contemplated to remove the water drops sticking to the surface of the mirror glass by imparting vibrations of the piezoelectric oscillator through an ultrasonic generator and amplifier. When the mirror glass is vibrated and water drops stuck to the surface, the water drops are subjected to vibrations by the mirror glass vibrator and they are separated either by their own weight or by evaporation.

In order to remove the water drops uniformly from the mirror glass it is necessary to apply vibrations evenly to whole mirror glass. However, in the conventional vibration mirrors, vibrations induced to the mirror glass by the piezoelectric oscillator propagate to a holding member which retains a circular edge portion of the mirror glass. Thereby the vibrations are influenced by the holding member and the water droplets repellent efficiency is decreased. In order to increase the water drop repellent efficiency, the oscillator is made with such a size which is almost the same as the size of the mirror glass. However, in doing so it pauses other problems such as for example increased electricity consumption of the oscillator.

Figure 12:
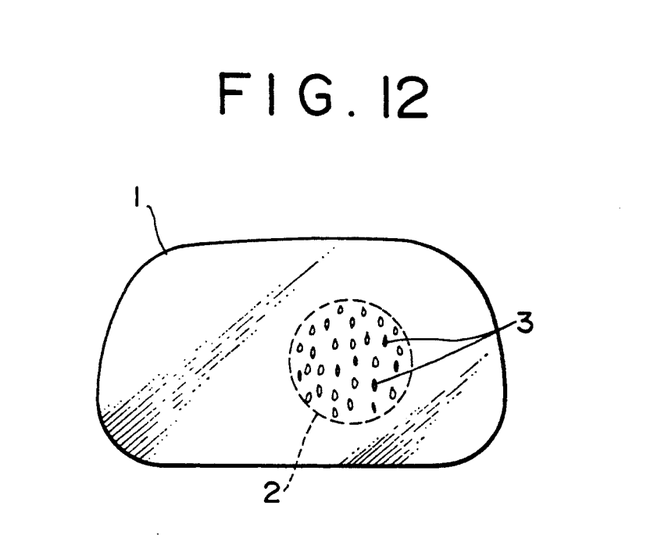
FIG. 12 is a front view showing water drops remaining on the mirror surface in a conventional water drop repellent mirror.

In addition, in the construction in which the piezoelectric oscillator 2 is tightly mounted on a part of the rear surface of the mirror glass 1 to provide bending vibrations, the evaporating removal is difficult for the water drops 3 sticking to the mirror surface in a part where an opposite portion of the piezoelectric oscillator 2 is affixed, as shown in FIG. 12. The reason why the evaporating removal of the water drops is difficult has not yet been clarified; however, it is presumed to be the following. When vibrations from the oscillator by means of the generator are applied to the mirror glass, a standing wave is produced on the mirror glass by interference of a progressive wave and a reflective wave. The water drops sticking on the mirror surface are evaporated and removed by this standing wave. When the vibrations are imparted to the mirror glass, the mass of the oscillator becomes a load mass and the reflected waves are absorbed by the oscillator. Thereby the portion where the oscillator was affixed becomes a nodal points of the vibrations causing the difficulty to produce the standing wave. Therefore the vibrating oscillations of said portion are small. For this reason it is believed that the water drops sticking to the mirror surface of said portion remain on the mirror surface without being evaporated and removed.

In the meantime, the inherent vibration magnitude of the mirror (resonance frequency) is variable, depending on the size of water drops or sticked condition. Since resonance frequency and the size of evaporatable particles are mutually related, it was difficult to remove all the water drops by a predetermined certain resonance frequency. Thereupon, another vibration mirror was proposed, with a frequency converter for converting a frequency of the input vibrations of the oscillator, such as for example disclosed in Japanese Laid Open Utility Model No. 63-69646 and Japanese Laid Open Patent No. 62-238149. This device converts the vibrating frequency generated by the generator at regular cycle by means of the frequency converter and amplifies the input signal to the oscillation by an amplifier, so that the oscillator is vibrated. If vibration of the oscillator creates the standing wave for removing the water drops from the mirror glass. By means of conversion of the vibration frequency of the generator, standing waves are removed and this increases the water drop repellent efficiency.

However, even with this vibration mirror which can convert the vibration frequency of the generator, it is very difficult to remove the cloud and frost stuck to the mirror surface due to outside temperature changes, or water drops of a re-sticked fine mist which impair the range of view. Therefore, during driving, the range view of the mirror is decreased and the rear view observation is not satisfactory due to remaining water drops on the mirror surface and due to the cloud and frost stuck on the mirror surface as a result of outside temperature changes.

SUMMARY OF THE INVENTION

Accordingly, it is a first object of the present invention to overcome the problems of the above mentioned mirrors.

In other words, it is an object of the present invention to provide a water drop repellent mirror with such an equipment which can remove the water drops from the mirror surface immediately and efficiently.

It is a second object of the present invention to provide a water drop repellent mirror which can remove all sticked water including cloud and frost from the mirror surface rapidly, regardless of the particle size of the water drops and sticked portion, by means of a piezoelectric oscillator and a heater arranged on the rear surface of the mirror.

It is a third object of the present invention to provide a vibration mirror with a heater on its back side, and with a vibration plate having a piezoelectric oscillator for imparting vibrations to a mirror glass on the back side of the latter, wherein the flat heater has thermal control characteristics to efficiently remove the water drops remaining on the mirror surface.

It is another object of the present invention to provide a vibration mirror in which the piezoelectric oscillator is arranged on the rear surface of the mirror, a generation circuit imparts vibrations to the piezoelectric oscillator at a desired frequency cycle, and a sweep circuit sweeps the frequency cycle respectively.

A water drop repellent mirror in accordance with the present invention has a vibration plate with a piezoelectric oscillator mounted on the back side of the mirror, and a heater placed in it to heat up the mirror surface. The piezoelectric oscillator on the rear surface of the mirror imparts ultrasonic vibrations to the mirror through the vibration plate. When the mirror surface resonates by inputting of the vibrations to the mirror, the water drops sticked to the mirror surface are dispersed. Re-frosted fine mist water drops and frozen frost are removed by heating up the mirror so that the clear mirror surface can be insured.

According to the present invention, a water repellent mirror adapted for outer use such as for example on the exterior of vehicles has a mirror glass formed with a light reflecting layer on its back side, a vibration plate firmly affixed to at least a part of the rear surface circular edge of the mirror glass, and a clearance is provided between the mirror glass and the vibration plate, and the vibrating wave generating means fixed to the vibration plate. The heating means is arranged on the rear side of the mirror glass to heat up the mirror glass.

Further, according to the present invention an outer mirror for vehicles is provided, which has a base fixed to an outer plate of a vehicle, a mirror body movably mounted on the base, a mirror element supported by the mirror body with an adjustable angle, and a vibration wave generating means imparting resonation to the mirror glass. The mirror element includes a mirror glass with a light reflective layer on its back, a vibration plate affixed to the rear surface circular edge of the mirror glass with acoustic impedance similar to the mirror glass, and a clearance is provided between the mirror glass and the vibration plate. A synthetic resin mirror holder is retained on the ends of the mirror glass and the vibration plate to protect the rear surface area. A piezoelectric oscillator is fixedly mounted on the vibration plate, a thin film is attached to the rear surface of the mirror glass for preventing scattering of broken pieces of the mirror glass, a positive thermal coefficient heater panel with a constant temperature heating control is mounted on the vibration plate in the clearance between the mirror glass and the vibration plate to heat up the mirror glass.

DESCRIPTION OF THE PREFERRED EMBODIMENTS

A water drop repellent mirror according to the present invention is suitable to be used as a rear view mirror adapted to be mounted on the exterior of vehicles, for example outer plates of doors or fenders.

Figure 1:
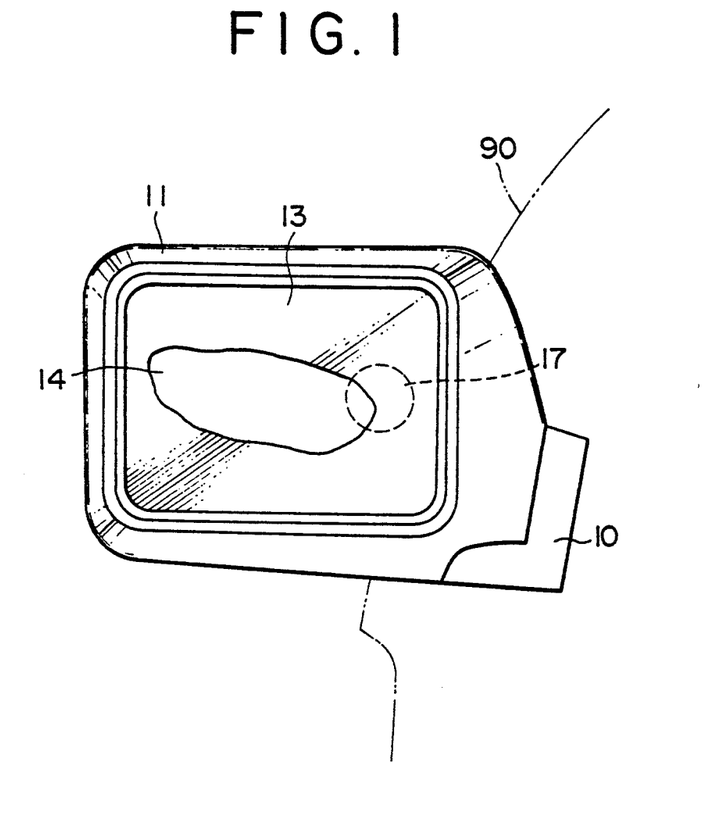
FIG. 1 is a front view showing one embodiment of a water drop repellent mirror according to the present invention.
Figure 2:
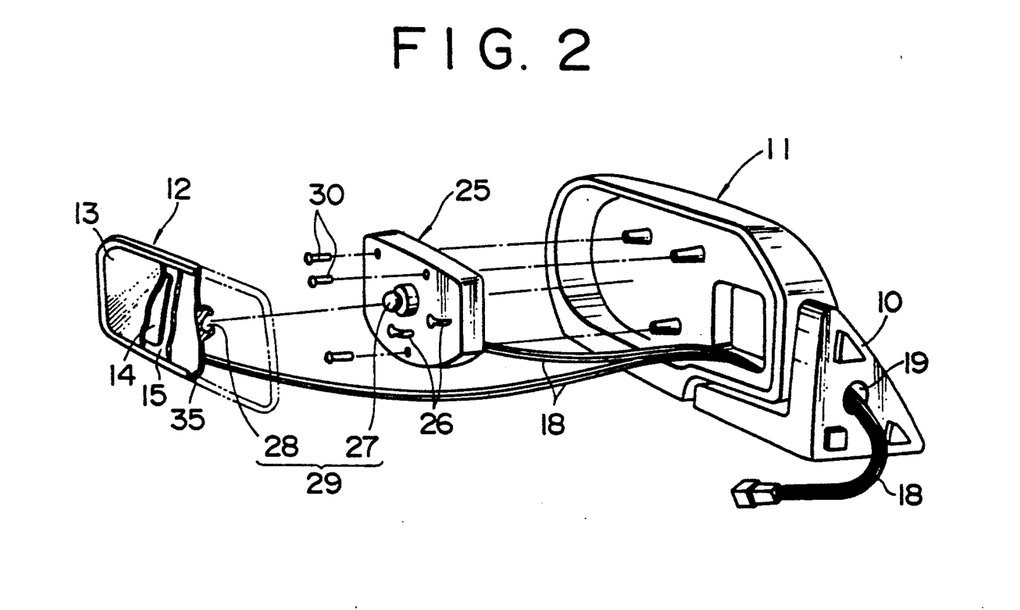
FIG. 2 is a perspective view showing a mirror inclined unit and a mirror element housed in a mirror body of the mirror of FIG. 1.

FIGS. 1 and 2 show a rear view mirror mounted on the exterior door surface of a vehicle 90.

In the rear view mirror a mirror body 11 is movably mounted on an extended portion of a base 10 fixed to the outer plate of a vehicle. The mirror body 11 is provided with a mirror inclining movable unit 25 and a mirror element 12 with a heating means for a mirror glass and a vibration wave generating means. Harness lines 18 are connected with the mirror inclining movable unit 25, while the mirror element 12 is connected to a controller and operation switch which are not shown in the drawings and can be introduced through an opening 19 in the base.

The mirror element 12 has a mirror glass 13 with a light reflecting layer on its back, a vibration plate 16 with an acoustic impedance similar to that of the mirror glass, a clearance 33 between the mirror glass the vibration plate, a synthetic resin mirror holder retained on the ends of the mirror glass and the vibration plate to protect the rear surface of the mirror glass. A detailed description will be presented hereinafter and accompanied with respective drawings to show the mirror element, the heating means for the mirror glass, the vibration wave generating means and their assembly.

The position of the mirror element 12 is adjusted in the vicinity of the mirror inclining movable unit 25 by a pair of adjustable axes 26 supported for a free turning by a socket 28 which protrudes from the mirror element 12. A motor and gear unit in the mirror inclining movable unit 25 provides a piston motion to the axes 26 so as to push or pull the mirror element 12 in the vicinity of a horizontal axis and a vertical axis. Such a mirror angle adjustable mechanism is disclosed in detail in U.S. Pat. No. 4,498,738. However. such an adjustable mechanism is not important for the disclosure of the present invention, and therefore the inclined unit 25 is merely illustrated here.

The mirror element 12 is connected with the mirror inclining movable unit 25 by a joint means 29 including a ball 27 and a ball socket 28. The mirror inclining movable unit 15 is mounted on the mirror body 11 by a mounting thread 30.

Figure 3:
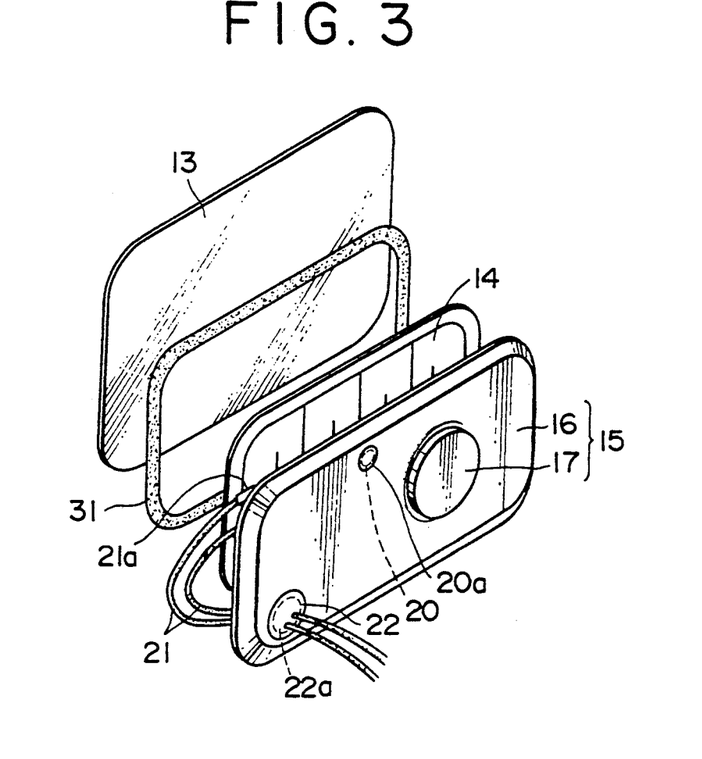
FIG. 3 is a perspective view showing a mirror element of the mirror of FIG. 1, with some exterior components omitted.
Figure 4A:
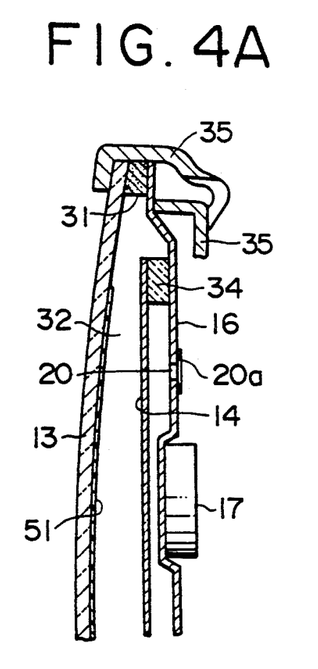
FIGS. 4A and 4B are enlarged vertical crosssectional views showing a mirror glass vibration system of the mirror of FIG. 1 in an assembled condition.
Figure 4B:
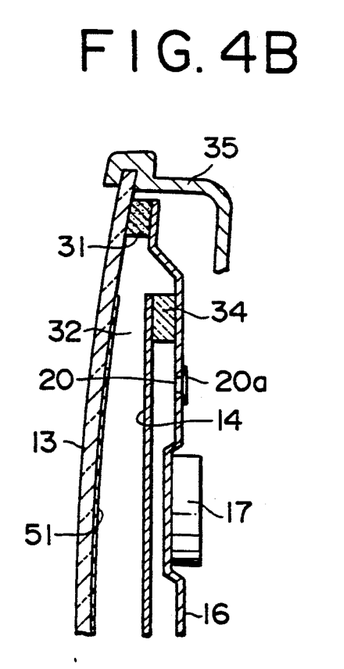

FIG. 3 is a view showing an internal structure of the mirror element 12. It has a mirror glass 13, a heater 14 located behind the mirror glass, a vibration assembly 15, an adhesion member 31 fixed firmly between the mirror glass and the vibration plate 16, and a mirror holder which is not shown. With respect to FIG. 3, the mirror glass 13 and the vibration assembly 15 are shown as separated from one another. However, the adhesion member 31 connected with one another as shown in FIGS. 4A and 4B.

The mirror glass 13 can be formed for example as a tempered glass plate which is chemically treated and has a thickness about 1 mm and a small mass. A heater 14 with a pair of electrodes is arranged in the rear side of the mirror glass. The heater can be formed as an independent panel shaped heater separated from the mirror glass. However, an electrically conductive thin film heater can also be used as a membrane integrally formed on the rear surface of the mirror glass.

Figure 6:
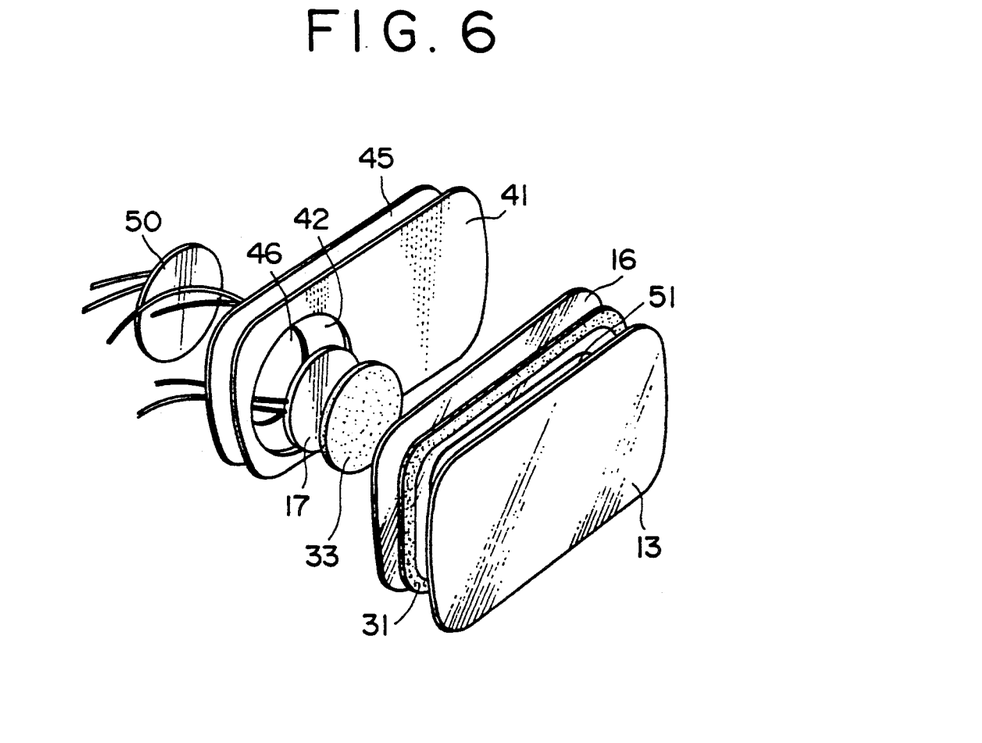
FIG. 6 is a perspective view showing a mirror element in accordance with another embodiment of the present invention, with some components omitted.
Figure 7:
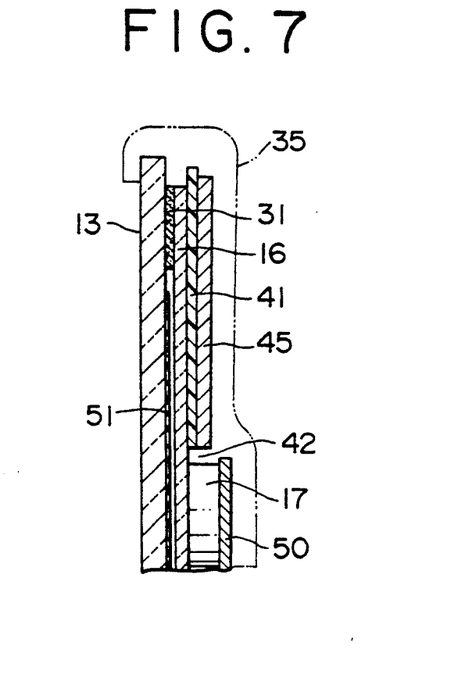
FIG. 7 is a view showing a vertical cross-section of the mirror element of FIG. 6 in an assembled condition.

The vibration assembly 15 includes a vibration plate 16 of a metal material and a piezoelectric oscillator 17 firmly affixed to the rear surface of the vibration plate by the adhesion member. A metal for the vibration plate 16 can be selected from stainless steel, industrial purpose nickel, zirconium, or a group of amorphous metals. It should have a vibration character (acoustic impedance) similar to the inherent vibration characteristics of the mirror glass 13. The vibration plate can be formed as a chemically tempered glass plate, as shown in FIGS. 6 and 7.

The piezoelectric oscillator 17 can be composed of polycrystalline substance of $BaTiO_3$ or $PbTiO_3$-$PbZrO_3$. The piezoelectric oscillator in this embodiment is a PZT commercially available from Clevite (now Vernitoron) in the U.S.A., corresponding to a circular flat plate-shaped piezoelectric oscillator with a piezoelectric ceramics having a vibration mode in a radial direction.

The clearance 32 shown in FIGS. 4A and 4B is provided between the mirror glass 13 and the vibration assembly 15, with the exception of the adhering portion of the peripheral edge of the mirror glass. The thickness of the clearance 32 is selected so that the heater panel 14 can be inserted. The adhesion member 31 can be composed of a thermosetting adhesive, such as for example epoxy adhesive used in this embodiment.

The adhesion member 31 shown in FIG. 3 has a ring sheet shape corresponding to the circular edge of the mirror glass, but of course not limited to such a shape. As shown later, shaped small pieces of the adhesion members 31 having any shape such as square or circular shapes, are placed in plural positions discontinuously on the circular edge of the rear surface of the mirror glass 13, so that the mirror glass 13 and the vibration plate 16 are connected firmly with one another. The vibration plate 16 in FIG. 3 has an air vent hole 20 in its periphery, and an aperture 22 is provided for passing the lead wires 21. The air vent hole 20 is sealed by a fiber material 20a with combined properties of ventillation and water-proof, for example a material known as Goretex or Microtex. The lead wires 21 connected to the heater electrode 21a pass through the aperture and extend rearwardly, with a silicon sealant 22a sealing the wires.

FIGS. 4A and 4B are a part of the vertical crosssectional view showing the vibration assembly 15 integrally adhered to the mirror glass 13 and retained by the mirror holder 35. FIG. 4A shows that the end edges of the mirror glass 13 and the vibration plate 16 are clamped, while FIG. 4B shows that the mirror glass 13 is supported by the mirror holder 35 so as to be separated from the vibration plate 16 at the rear side.

The mirror holder 35 is composed of a flexible material acceptable for the vibration of the mirror glass 13, such as polyethylene, polyacethal resin and polypropylene resin.

Figure 5A:
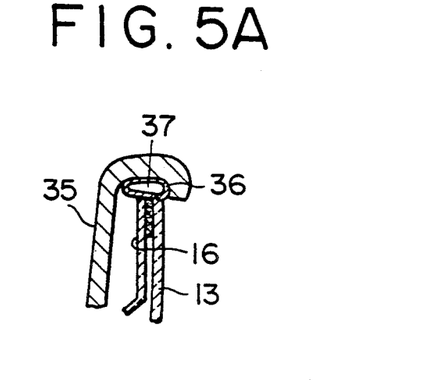
FIGS. 5A and 5B are enlarged vertical cross-sectional views showing another embodiment of mounting the mirror glass on a mirror holder.
Figure 5B:
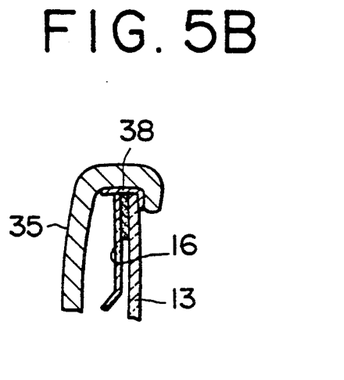

FIG. 5A shows a cushion shield 36 interposed between the mirror holder 35 and both edges of the mirror glass 13 and the vibration plate 16 for preventing the reduction of the mirror glass vibration by the mirror glass holder 35 during vibration of the mirror glass by a piezoelectric oscillator. Numeral 37 identifies an air layer with an air bubble in the cushion sheet 36. Numeral 38 in FIG. 5B identifies a sliding sheet made of a high polymer material with rigidity and low coefficient of friction such as for example Teflon for the purpose of preventing the reduction of vibrations similarly to FIG. 5A. The sliding sheet is interposed between the mirror holder 35 and both edges of the mirror glass 13 and the vibration plate 16.

When water drops sticked on the surface of the mirror glass 13 in the water drop repellent mirror in accordance with the above described construction, the piezoelectric oscillator 13 starts to vibrate the mirror glass 13 by a resonance frequency cycle via a generation circuit not shown in the drawings. Subsequently, the vibrations of the piezoelectric oscillator 17 are propagated to the mirror glass 13 through the vibration plate 16, and thereby standing waves are formed in the mirror glass. By means of such standing waves, the mirror glass 13 vibrates at a high speed, and thereby water drops sticked on the surface of the mirror glass are evaporated. Simultaneously with the vibration of the piezoelectric oscillator or after certain hours of operation of it, the heater 14 is heated by passing electric current therethrough for certain hours. Thereby, the mirror glass 13 is heated up and it can remove the fine mist of the water drops or frozen frost which were not removed by the standing waves.

The heater 14 in the embodiment shown in FIGS. 3 and 4 is arranged in the clearance 32 between the mirror glass 14 and the vibration plate 16, to increase the thermal conductivity. The heater 14 is mounted on the vibration plate through a vibration shield with an adhesive or the insulation member 34. Foamed sheet of polypropylene resin can be used as a vibration shield or insulation member. The heater 14 can be placed on the rear side of the vibration plate or both on the rear side of the mirror glass and the rear side of the vibration plate.

FIG. 6 shows the mirror element in a disassembled condition, with the heater panel 45 placed on the rear side of the vibration plate 16. In this embodiment, the vibration plate 16 (for instance made of chemically tempered glass) tightly adheres to the circular edge of the rear side of the mirror glass 13 (for instance made of chemically tempered glass) by the adhesion member 31. Also on the rear surface of the vibration plate 16, the piezoelectric oscillator 17 adheres through the adhesive member 33 on the rear surface of the vibration plate, with the exception of the portion of the piezoelectric oscillator 17. A heater panel 45 is further arranged on the rear surface of the high polymer material sheet 41 in a hermetic manner as shown in FIG. 7.

The high polymer material sheet 41 and the heater panel 45 have window holes 42 and 46 for accommodating the piezoelectric oscillator 17 as shown in FIG. 6. A small heater panel 50 is hermetically arranged on the area of the external surface of the piezoelectric oscillator 17 exposed through the window holes 42 and 46, in addition to the heater panel 45.

The high polymer material sheet 41 minimizes the propagation of the vibrations to the heater panel 45 with an air layer. It is used to minimize the vibration reduction so that it is possible to use the same form of a polypropylene or polyethylene sponge sheet, fiber sheet or a composite sheet, or a metal powder containing sheet to increase the thermal conductivity.

The heater panels 45 and 50 can be formed as a heat generator having a positive thermal coefficient thermistor (PTC thermistor) with self thermal control characteristic. The heater panels 45 and 50 consisting of such PTC thermistor have a pattern of combined shape with comb teeth-shaped electric conductors from upper and lower ends which do not overlap each other. In a critical temperature is reached, electric current is controlled by increasing self resistant value, and due to this reaction the heater panel has a characteristic of a self control such that the generator does not exceed a certain temperature. Therefore, it is not necessary to use temperature controllers such as thermostats, and also the electric power consumption is very low. It also has an advantage of an easy set up, as compared with the thin film heater.

Figure 8:
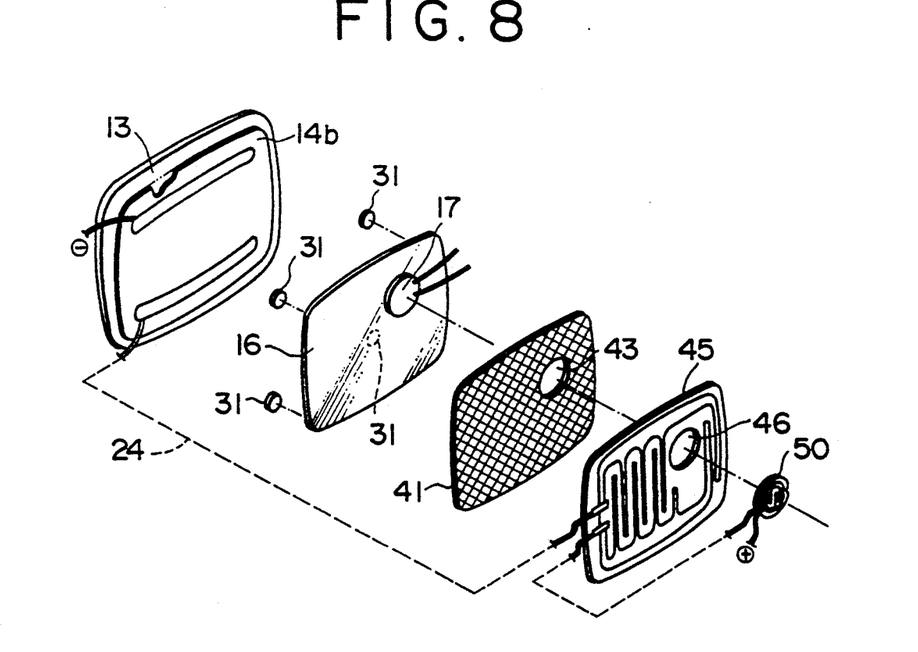
FIG. 8 is a perspective view showing a further embodiment of the mirror element, with some components
Figure 9:
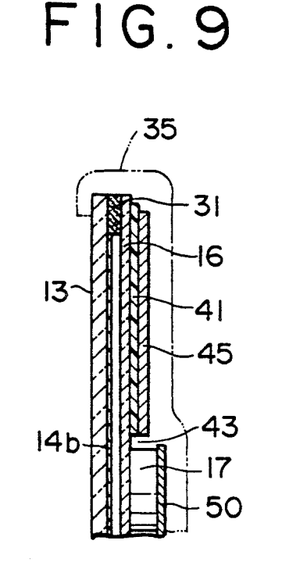
FIG. 9 is a vertical cross-sectional view showing the mirror element of FIG. 8 in an assembled condition.

FIG. 8 shows the mirror element in disassembled condition, with the heater panel arranged separately from the vibration plate on the rear surface of the vibration plate 16 and formed as an integral heater 14b produced by metal evporation of an electrically conductive thin film on the rear surface of the mirror glass 13. In this embodiment the vibration plate 16 on the circular edge of its rear surface adheres through small pieces of adhesion member 31, for example 4–6 members (4 are shown in the drawings). Numeral 17 identifies a piezoelectric oscillator adhering by the adhesive member 33 to the rear surface of the vibration plate, 41 identifies a high polymer material sheet arranged on the rear surface of the vibration plate with the exception of the piezoelectric oscillator, 45 is a heater panel hermetically arranged at the back side of the high polymer material sheet, 50 is a small heater panel hermetically placed at the back side of the piezoelectric oscillator. The heater panels 45 and 50 are used as a heat generation body with self thermal control characteristics. The thin film heater 14 and the heater panels 45, 50 are connected electrically in series by lead wires. The piezoelectric oscillator 17 is accommodated in the window holes 43, 46. The air layer accommodating the high polymer material sheet 41 and the heater panel 50 is overlapped. The small heater panel 50 is attached to the exterior to the piezoelectric oscillator 17, the thusly arranged elements are fixed to the mirror holder 35.

In the above constructed vibration mirror, the piezoelectric oscillator 7 is driven by the vibration generating circuit which is not shown in the drawings. Any water drops sticked to the mirror glass are dispersed or evaporated by means of standing waves produced on the mirror glass 13. Fine mist water drops re-sticked or frozen frost on the mirror glass are removed by heating the passage of electricity of the thin film heater 14b formed on the rear surface of the mirror glass and the heater panel 45, 50 of the rear surface of the vibration plate. When the heating devices of this thin film heater 14b and the heater panel 45, 50 including PTC thermistor, are connected electrically in series as shown in FIG. 8, it has the advantage of not only in that a starting up time of the temperature increase to the mirror glass at certain temperature (for example at 65° C.) is very quick, but also in that the electricity consumption is comparatively low. When the critical temperature is reached, electric current is controlled by increasing the own resistant value of the heater panel, and the reaction of the heater panel 45, 50 and the thin film heater 14b does not increase the heating temperature more than certain temperature.

Figure 10:
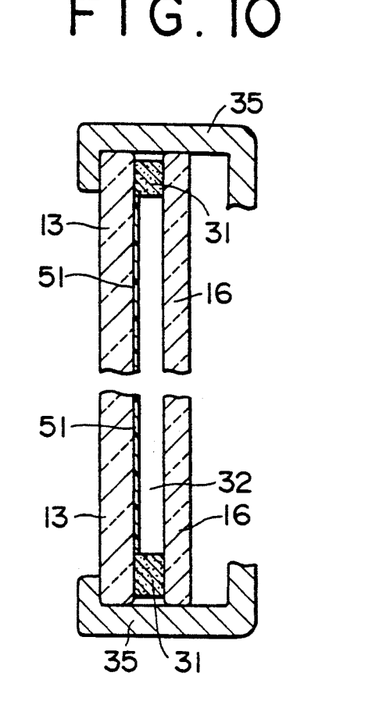
FIG. 10 :s a vertical cross-sectional view showing a mirror element in accordance with a third embodiment of the present invention, in an assembled condition.

FIG. 10 is a schematic sectional view showing a mirror element including two mirror glass plates. The vibration plate 16 made of chemically tempered treated glass plate is located at the rear side of the mirror glass 13. The two glasses 13 and 16 are secured by the adhesion member 31 and the mirror holder 35 holds the outer periphery. Numeral 32 is a clearance formed between the mirror glass 13 and the vibration plate 16, and numeral 51 is a thin film for preventing scattering of the broken pieces of glass.

FIGS. 4A and 4B are vertical cross-sectional views in which numeral 51 shows a thin film adhered on the rear surface of the mirror glass 13 for preventing scattering of broken pieces of glass or retaining such pieces when some physical impact was applied to the mirror glass or when the mirror glass was broken by rapid temperature change. The thin film 51 can be composed of polyester film with a thickness about $50\mu$. Numeral 20 in FIGS. 4A and 4B shows an air vent hole provided in the vibration plate 16. The hole is sealed by a fiber material 20a having combined properties of ventilation and waterproof as mentioned before.

Figure 11:
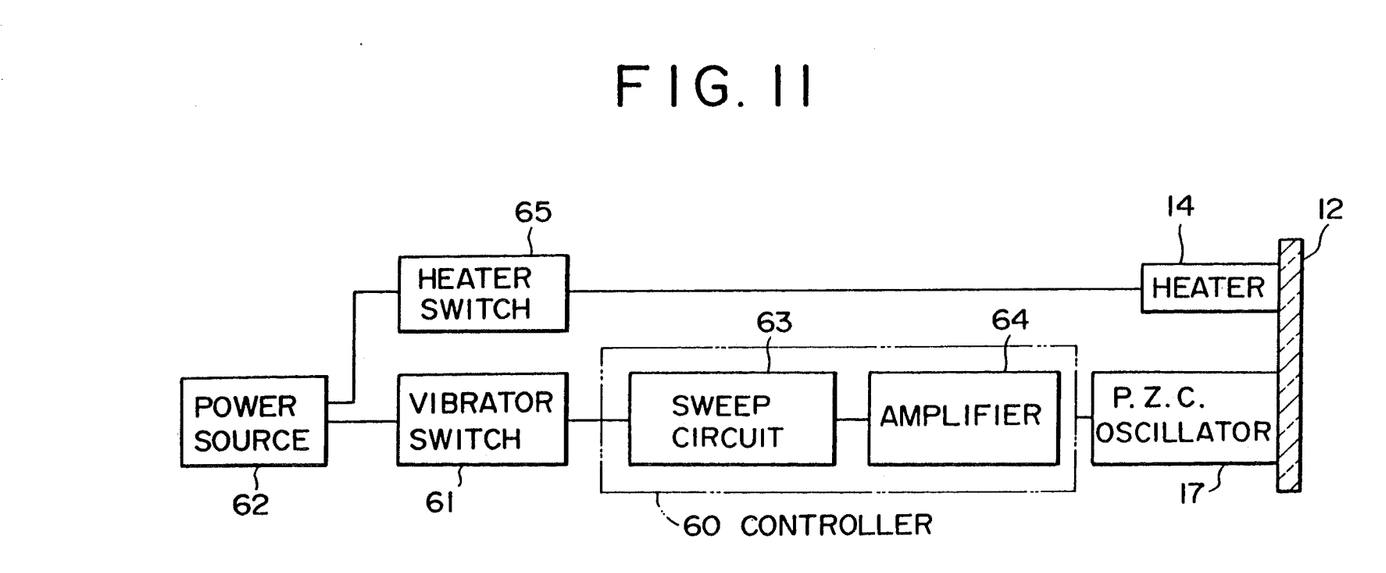
FIG. 11 is a block diagram showing a structure of an electrical control of a piezoelectric oscillator and a heater in accordance with the present invention.

FIG. 11 is a block diagram showing an electric control of the piezoelectric oscillator 17 and the heaters 14, 14a, 45, 50.

The control portion of the vibration plate has control means of a controller 60 connected to the oscillator which is mounted on the mirror element and controlling vibrations of the oscillator. It also has an operation switch 61 to operate to controller and a power source 62. The controller 60 of the oscillator has a sweep circuit for generating vibrations so as to vary the frequency of input vibrations by oscillator for increasing the water drop repellent efficiency of sticked water drop on the mirror surface. The controller 60 also has an amplifier 64 for amplifying the input signal to the oscillator. The control portion of the heater includes control means with the heater 14 mounted on the mirror element 12, a heat control switch 64 and a power source 62.

The oscillator provides vibrations with a predetermined optimum frequency cycle to disperse the water drops sticked to the mirror surface. For example, in case of the door mirror shown in FIG. 1, 50–30 KHz frequency cycle is used, and with the signal output from the sweep circuit for generating vibrations the electric pressure or compliance with the signal is supplied to the piezoelectric oscillator 17 through the amplifier 64. This vibration of the oscillator sweeps for instance by standard frequency per second (for example 30 KHz), thereby imparting the vibrations to the mirror glass at this frequency. In subsequent steps for example 100 Hz is added to the first standard frequency, providing the vibration at 30.1 KHz. Further, in the next subsequent step in addition to 30.1 KHz, 100 Hz frequency is added, providing the vibration at 30.2 KHz. Thus, by adding some frequency to the first standard frequency in consecutive order, the frequency of the input vibrations in the set up frequency cycle can be continuously varied and thereby provide the vibrations to the mirror glass. By repeating the procedure, water drops sticked to the mirror surface can be removed.

We claim:

1. A water drop repellent mirror for outdoor use, comprising a mirror glass having a rear surface with a edge and provided with a light reflecting layer at a rear side; a vibration plate connected with at least a part of said edge of said rear surface of said mirror glass arranged so as to from a clearance between said mirror glass arranged so as to form a clearance between said mirror glass and said vibration plate; vibration wave generating means connected with said vibration plate; and heating means arranged on said rear side of said mirror glass so as to heat up said mirror glass.

2. A water drop repellent mirror as defined in claim 1, wherein said vibration plate is composed of a material selected from the group consisting of stainless steel, industrial purpose nickel, zirconium and amorphous metal.

3. A water drop repellent mirror as defined in claim 1, wherein said vibration plate has an acoustic impedance substantially the same as that of said mirror glass.

4. A water drop repellent mirror as defined in claim 1, wherein said mirror glass and said vibration plate consist of tempered glass.

5. A water drop repellent mirror as defined in claim 1, wherein said vibration wave generating means is a piezoelectric oscillator connected to said vibration plate to resonate said mirror glass.

6. A water drop repellent mirror as defined in claim 5, wherein said piezoelectric oscillator consists of piezoelectric ceramic.

7. A water drop repellent mirror as defined in claim 1, wherein said vibration plate has a circular edge fixed with said circular edge of said rear surface of said mirror glass; and further comprising means for fixing said edges of said vibration plate and said mirror glass with one another.

8. A water drop repellent mirror as defined in claim 7, wherein said fixing means includes a thermosetting epoxy adhesive.

9. A water drop repellent mirror as defined in claim 1, wherein said heating means includes a heater panel mounted on said vibration plate.

10. A water drop repellent mirror as defined in claim 1, wherein said heating means includes an electrically conductive thin film heater formed as a membrane on said rear surface of said mirror glass.

11. A water drop repellent mirror as defined in claim 9, wherein said heater panel is formed as a positive thermal coefficient heater panel operative for maintaining a constant temperature.

12. A water drop repellent mirror as defined in claim 1, wherein said heating means includes an electrically conductive thin film heater formed as a membrane in said rear surface of said mirror glass, and a positive thermal coefficient heating panel with a characteristics of constant temperature heating control and mounted on said vibration plate.

13. A water drop repellent mirror as defined in claim 9, and further comprising a vibration insulating member interposed between said vibration plate and said heater panel.

14. A water drop repellent mirror as defined in claim 9, wherein said heater panel is arranged in said clearance.

15. A water drop repellent mirror as defined in claim 1, and further comprising a thin film provided on said rear surface of said mirror glass for preventing scattering of broken pieces of said mirror glass.

16. A outer mirror for vehicles, comprising a mirror glass having a rear surface with an edge and a light reflecting layer on a rear side of said mirror glass; a vibration plate connected to said edge of said rear surface of said mirror glass and having acoustic impedance substantially the same as that of said mirror glass, said vibration plate being arranged so as to provide a clearance between said vibration plate and said mirror glass; a synthetic resin mirror holder retained on said mirror glass and said vibration plate to protect said rear surface; a piezoelectric oscillator mounted on said vibration plate; a thin film adhering to said rear surface of said mirror glass for preventing scattering of broken pieces of said mirror glass; and a positive thermal coefficient heater panel with operative for maintaining a constant temperature and mounted on said vibration plate in said clearance to heat up said mirror glass.

17. An outer mirror as defined in claim 16, and further comprising a vibration insulating member arranged between said vibration plate and said heater panel.

18. AN outer mirror as defined in claim 16, wherein said vibration wave generating means has control means including a sweep generator connected to said piezoelectric oscillator, am amplifier control circuit, a generator start-up operation switch, and a power source.

19. An outer mirror as defined in claim 16, wherein said positive thermal coefficient heater panel has control means including a heater control switch and a power source.

20. An outer mirror as defined in claim 16, and further comprising a mirror holder, and a cushion sheet having an air layer and interposed between said mirror holder and edges of said mirror glass and said vibration plate.

21. An outer mirror as defined in claim 16, and further comprising a mirror holder; and a sliding sheet composed of high polymer material and having rigidity and low coefficient of friction, said sliding sheet being interposed between said mirror holder and edges of said mirror glass and said vibration plate.

* * * * *